United States Patent
Ii et al.

(10) Patent No.: US 7,305,122 B2
(45) Date of Patent: Dec. 4, 2007

(54) METHOD AND COMPUTER PROGRAM PRODUCT FOR IDENTIFYING AND CORRECTING SYSTEMATIC NOISE IN A PATTERN RECOGNITION SYSTEM

(75) Inventors: David L. Ii, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 843 days.

(21) Appl. No.: 10/217,887

(22) Filed: Aug. 13, 2002

(65) Prior Publication Data

US 2004/0032981 A1   Feb. 19, 2004

(51) Int. Cl.
G06K 9/62 (2006.01)
(52) U.S. Cl. ...................................... 382/159
(58) Field of Classification Search ................. 382/159
See application file for complete search history.

(56) References Cited

U.S. PATENT DOCUMENTS

| | | |
|---|---|---|
| 4,451,929 A | 5/1984 | Yoshida |
| 4,475,234 A | 10/1984 | Nishijima et al. |
| 5,003,490 A | 3/1991 | Castelaz et al. |
| 5,060,279 A | 10/1991 | Crawford et al. |
| 5,265,192 A | 11/1993 | McCormack |
| 5,396,565 A | 3/1995 | Asogawa |
| 5,455,892 A | 10/1995 | Minot et al. |
| 5,561,718 A | 10/1996 | Trew et al. |
| 5,583,968 A | 12/1996 | Trompf |
| 5,712,922 A | 1/1998 | Loewenthal et al. |
| 5,719,692 A | 2/1998 | Cohen |
| 6,847,731 B1 * | 1/2005 | Caulfield ................... 382/159 |
| 2004/0205482 A1 * | 10/2004 | Basu et al. .............. 715/500.1 |

OTHER PUBLICATIONS

Sarawagi, Sunita, Bhamidipaty, Anuradha. "Interactive Deduplication using Active Learning." Proceedings of the 8th ACM SIGKDD International Conference on Knowledge Discovery and Data Mining (KDD-2002), ACM Jul. 2002.*
Cullen, Mark, Pintsov, Leon, Romansky, Brian. "Reading Encrypted Postal Indicia." IEEE 1995.*

* cited by examiner

Primary Examiner—Bhavesh M Mehta
Assistant Examiner—Jonathan Schaffer
(74) Attorney, Agent, or Firm—Tarolli, Sundheim, Covell & Tummino LLP

(57) ABSTRACT

The present invention recites a method and computer program product for identifying and correcting systematic noise in a pattern recognition classifier. A plurality of input patterns that have been determined not to be associated with any of a set of at least one represented output class are rejected by the pattern recognition classifier. A subset of pattern samples is selected from the rejected input patterns based upon the similarity of each pattern to one of the represented output classes. The selected pattern samples are subjected to an independent review to determine if they were correctly rejected. The classifier is retrained based upon this independent review of the selected pattern samples.

18 Claims, 3 Drawing Sheets

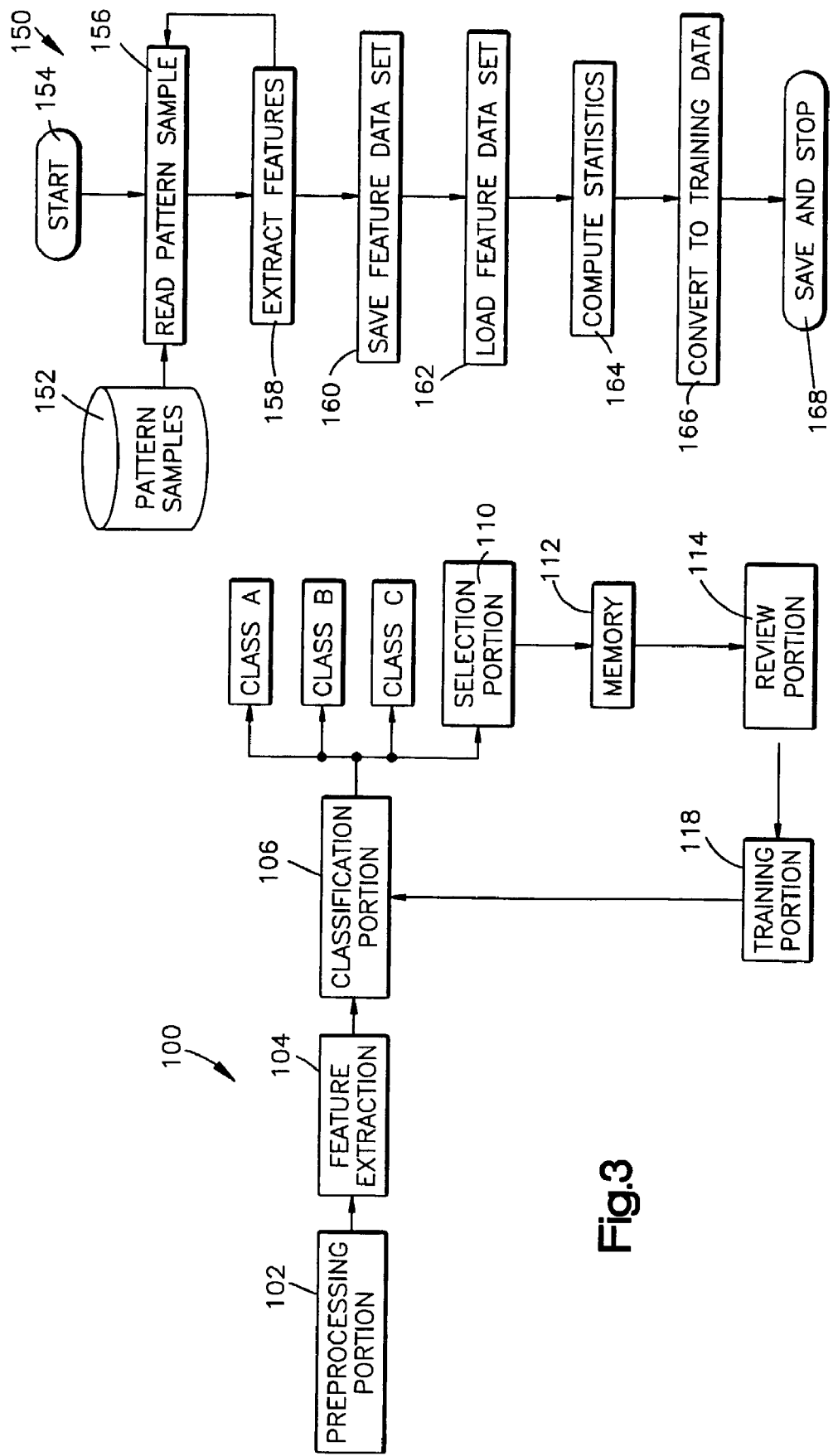

METHOD AND COMPUTER PROGRAM PRODUCT FOR IDENTIFYING AND CORRECTING SYSTEMATIC NOISE IN A PATTERN RECOGNITION SYSTEM

BACKGROUND OF THE INVENTION

1. Technical Field

The invention relates to a system for correcting systematic noise in a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console.

Over a long period of operation, a number of small sources of error can find their way into a pattern recognition classifier. Most often, such systematic error will be found in the portion of the system responsible for acquiring a pattern in digital form. For example, in an image recognition system, dust can accumulate on a lens, or conveyor belts carrying a sample to the scanner can slip, causing minor errors within the scanned image. Such minor problems are numerous, and not all of them can be anticipated during training. Even where the problem is discovered, the system must be shut down for repair of the defect each time discrepancies are discovered. Prior to discovery of the defect, a number of input patterns will be classified incorrectly. Accordingly, it would be useful to have a system that is capable of tracking these small errors and accounting for them during run time operation.

SUMMARY OF THE INVENTION

In accordance with one aspect of the present invention, a method is disclosed for identifying and correcting systematic noise in a pattern recognition classifier. A plurality of input patterns that have been determined not to be associated with any of a set of at least one represented output class are rejected by the pattern recognition classifier. A subset of pattern samples is selected from the rejected input patterns based upon the similarity of each pattern to one of the represented output classes. The selected pattern samples are subjected to an independent review to determine if they were correctly rejected. The classifier is retrained based upon this independent review of the selected pattern samples.

In accordance with another aspect of the invention, a computer program product is disclosed for identifying and correcting systematic noise in a pattern recognition classifier. A classification portion rejects a plurality of input patterns determined not to be associated with any of a set of at least one represented output class. A selection portion then selects a subset of pattern samples from the rejected input patterns based upon the similarity of each pattern to one of the represented output classes. These selected pattern samples are inputted into a review portion that subjects them to an independent review to determine if they were correctly rejected. Finally, a training portion retrains the classifier based upon the independent review of the selected pattern samples.

BRIEF DESCRIPTIONS OF THE DRAWINGS

The foregoing and other features of the present invention will become apparent to one skilled in the art to which the present invention relates upon consideration of the following description of the invention with reference to the accompanying drawings, wherein:

FIG. 3 is a functional diagram of a postal indicia recognition system incorporating an example embodiment of the present invention;

FIG. 4 is a flow diagram illustrating the training of a classifier compatible with the present invention.

DETAILED DESCRIPTION OF THE INVENTION

In accordance with the present invention, a method for identifying and correcting systematic drift in a pattern recognition classifier is described. The method may be applied to classifiers used in any traditional pattern recognition classifier task, including, for example, optical character recognition (OCR), speech translation, and image analysis in medical, military, and industrial applications.

It should be noted that a pattern recognition classifier to which the present invention may be applied will typically be implemented as a computer program, preferably a program simulating, at least in part, the functioning of a neural network. Accordingly, understanding of the present invention will be facilitated by an understanding of the operation and structure of a neural network.

Figure 1:
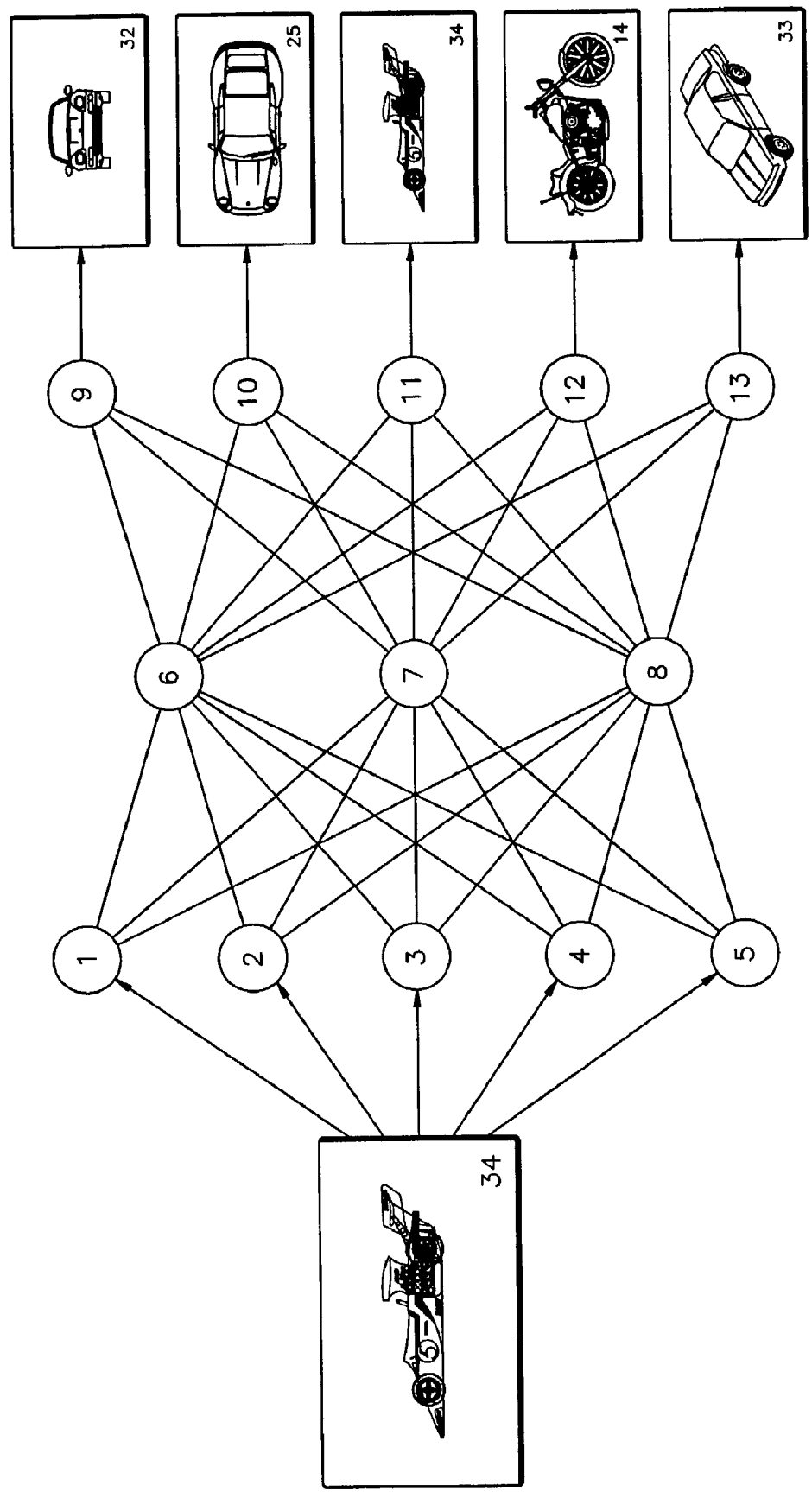
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. In addition, additional hidden layers might be required.

In the illustrated example, an input layer comprises five input nodes, 1-5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1-5 receives input signals with values relating to features of an input pattern. By way of example, the signal values could relate to the portion of an image within a particular range of grayscale brightness. Alternatively, the signal values could relate to the average frequency of a audio signal over a particular segment of a recording. Preferably, a large number of input nodes will be used, receiving signal values derived from a variety of pattern features.

Each input node sends a signal to each of three intermediate nodes 6-8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weight of the connection between node 1 and nodes 6-8 are 0.6, 0.2, and 0.4 respectively. The signals passed from node 1 to the intermediate nodes 6-8 will have values of 3, 1, and 2.

Each intermediate node 6-8 sums the weighted input signals it receives. This input sum may include a constant bias input at each node. The sum of the inputs is provided into an transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6-8 pass a signal with the computed output value to each of the nodes 9-13 of the output layer. An individual intermediate node (i.e. 7) will send the same output signal to each of the output nodes 9-13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
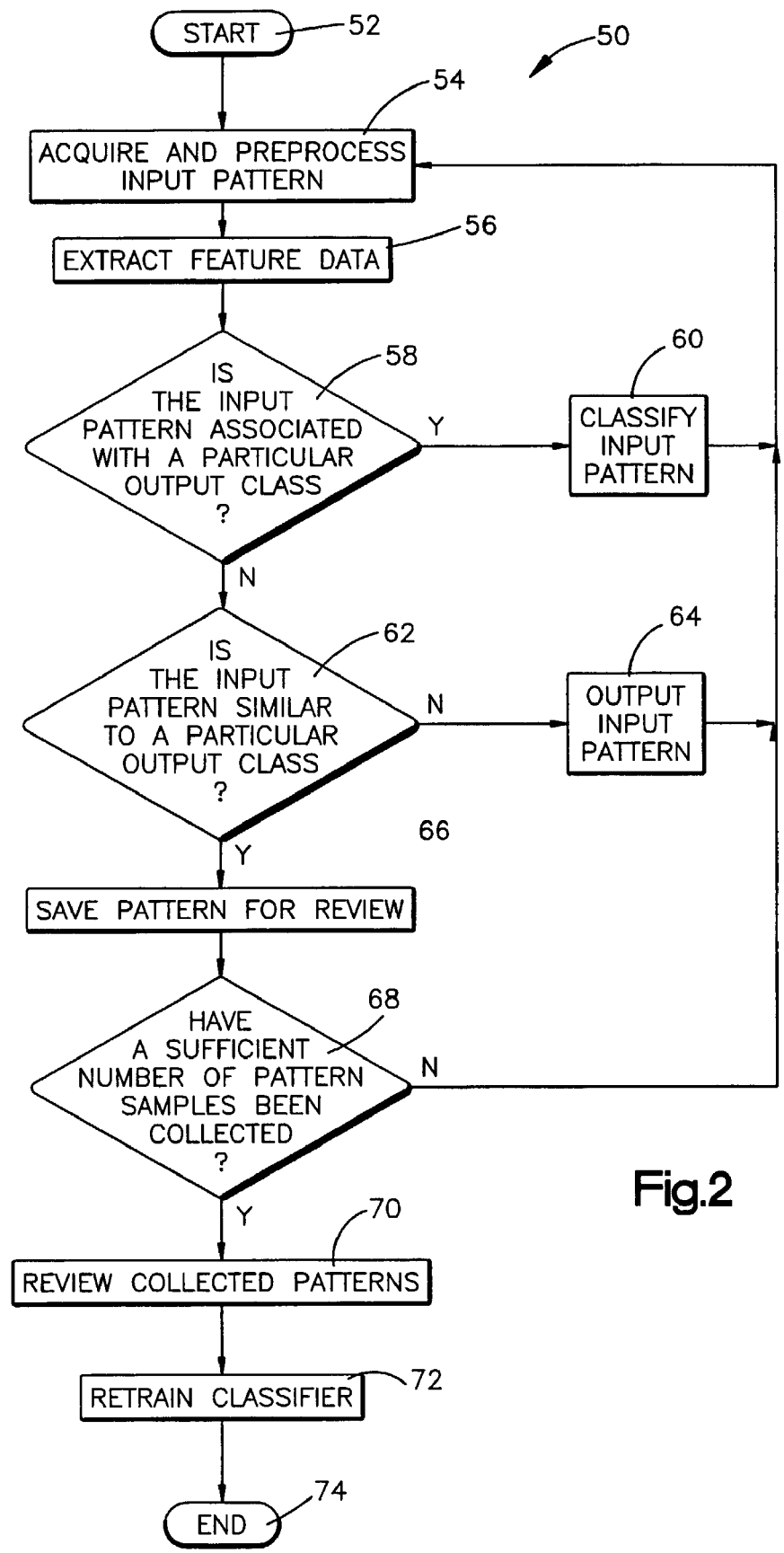
FIG. 2 is a flow diagram illustrating the operation of a pattern recognition system incorporating the present invention.

FIG. 2 is a flow diagram illustrating the noise tracking system of the present invention in the context of a pattern recognition system representing at least one output class. As stated above, the present invention and any associated classification system will likely be implemented, at least in part, as software programs. Therefore, the structures described herein may be considered to refer to individual modules and tasks within these programs.

The process 50 begins at step 52 and proceeds to step 54, where an input pattern is acquired and preprocessed. During preprocessing, the pattern is enhanced, portions of interest are located, and obvious noise is eliminated. Other alterations to the input pattern may be made to prepare the pattern for further processing.

The process then proceeds to step 56, where feature data is extracted from the pattern. Feature extraction converts the pattern into a vector of numerical measurements, referred to as feature variables. Thus, the feature vector represents the pattern in a compact form. The vector is formed from a sequence of measurements performed on the pattern. Many feature types exist and are selected based on the characteristics of the recognition problem.

The process then advances to step 58, where the system determines if the input pattern is associated with an output class represented by the system. This determination will vary depending on the classification technique used. If the system determines that the input pattern is associated with a represented output class, the process proceeds to step 60, where the system outputs the classification result and returns to step 54 to process another input pattern.

If the input pattern is rejected (i.e. not determined to be associated with a particular class), the process advances to step 62. At step 62, the system determines if the input pattern is very similar to the patterns associated with a represented class. The specifics of this determination will vary, depending on the classification technique used by the classifier. If the input pattern is not similar to the patterns associated with a represented class, the input pattern is outputted for alternative processing 64, and the system returns to step 54 to process another input pattern.

If the input pattern is similar to a represented class, the process continues to step 66, where the pattern is saved for review. The process then advances to step 68, where the system determines if a sufficient number of samples have been collected for review. If an insufficient number of samples have been collected, the system returns to step 54 to process another pattern.

If a sufficient number of pattern samples have been collected, the process proceeds to step 70, where the samples are subjected to independent review to classify the rejected samples. This can be accomplished in a number of ways, including verification by an independent computer system, on-site review by a second classifier, or human intervention.

The process then proceeds to step 72, where the pattern samples are used to retrain the classifier. This training will allow the system to recognize samples affected by systematic noise within the system. Accordingly, the noise can be accounted for during real-time operation of the system. The process then terminates at step 74.

FIG. 3 illustrates an example embodiment of a postal indicia recognition system 100 incorporating the systematic noise tracking of the present invention. It should be noted that the present invention and any corresponding classification system will likely be implemented as a computer program. Therefore, the structures described hereinafter may be considered to refer to individual modules and tasks within that program.

At the preprocessing portion 102, an input image is obtained and extraneous portions of the image are eliminated. In the example embodiment, the system locates any potential stamps within the envelope image. The image is segmented to isolate the stamps into separate images and extraneous portions of the stamp images are cropped. Any rotation of the stamp image is corrected to a standard orientation. The preprocessing portion 102 then creates an image representation of reduced size to facilitate feature extraction.

The preprocessed pattern segment is then passed to a feature extraction portion 104. The feature extraction portion 104 analyzes preselected features of the pattern. The selected features can be literally any values derived from the pattern that vary sufficiently among the various output classes to serve as a basis for discriminating among them. Numerical data extracted from the features can be conceived for computational purposes as a feature vector, with each element of the vector representing a value derived from one feature within the pattern. Features can be selected by any reasonable method, but typically, appropriate features will be selected by experimentation. In the preferred embodiment of a postal indicia recognition system, a thirty-two element feature vector is used, including sixteen histogram feature values, and sixteen "Scaled 16" feature values.

A scanned grayscale image consists of a number of individual pixels, each possessing an individual level of brightness, or grayscale value. The histogram portion of the feature vector focuses on the grayscale value of the individual pixels within the image. Each of the sixteen histogram variables represents a range of grayscale values. The values for the histogram feature variables are derived from a count of the number of pixels within the image having a grayscale value within each range. By way of example, the first histogram feature variable might represent the number of pixels falling within the lightest sixteenth of the range all possible grayscale values.

The "Scaled 16" variables represent the average grayscale values of the pixels within sixteen preselected areas of the image. By way of example, the sixteen areas may be defined by a four by four equally spaced grid superimposed across the image. Thus, the first variable would represent the average or summed value of the pixels within the upper left region of the grid.

The extracted feature vector is then inputted into a classification portion 106. At the classification portion, the feature vector is compared to training data from a number of output classes. A variety of classifier architectures and techniques may be selected for making this determination. In the example embodiment, for the sake of simplicity, the classification portion 106 makes use of a Bayesian Mahalanobis distance classification system.

The classification portion attempts to match the input feature vector to one of a plurality of represented classes using the selected classification technique. In this process, a class will be selected and a corresponding confidence measurement will be calculated. If the confidence measurement is above a predetermined threshold, the feature vector is classified as the corresponding class. If the confidence measurement does not exceed the threshold, the feature vectors are sent to the selection portion 110.

At the selection portion 110, the confidence measurement will be compared to a second predetermined threshold value, slightly smaller than the earlier threshold. If the confidence measurement does not exceed the second threshold, the sample is rejected; no classification is made. If the confidence measurement exceeds the second threshold, it is stored in a memory 112 for later analysis.

Once a sufficient number of samples have been accumulated, the samples are passed to a review portion 114 for independent review of the classification result. It should be noted that the two thresholds are very similar. An input image with an associated confidence value that fails to meet the first threshold but exceeds the second is very similar to other images that are members of the selected class. Such a small deviation could be the result of dust, mechanical wear, or any number of other external factors. Accordingly, the samples should be reviewed by an agent that is not affected by this systematic error.

This independent review can be accomplished by a number of methods, including computerized verification, on-site review by a second classification system, or human intervention. In the example embodiment, the samples are classified by a human operator. After classification, the selected image samples that have been improperly rejected are passed to a training portion 118.

The training portion 118 retrains the original classifier on the image samples provided by the review portion 116. Training the classifier on images containing a variety of systematic noise will allow the system to track the noise, adjusting classification decisions to account for its presence. This can be accomplished without disturbing the operation of the original classifier, allowing real-time adjustments in response to any unexpected noise.

FIG. 4 is a flow diagram illustrating the operation of a computer program 150 used to train a pattern recognition system via computer software. A number of pattern samples 152 are generated or collected from a population of real-world patterns. The number of pattern samples necessary for training varies with the application. The number of output classes, the selected features, and the nature of the classification technique used directly affect the number of samples needed for good results for a particular classification system. While the use of too few images can result in an improperly trained classifier, the use of too many samples can be equally problematic, as it can take too long to process the training data without a significant gain in performance.

The actual training process begins at step 154 and proceeds to step 156. At step 156, the program retrieves a pattern sample from memory. The process then proceeds to step 158, where the pattern sample is converted into a feature vector input similar to those a classifier would see in normal run-time operation. After each sample feature vector is extracted, the results are stored in memory, and the process returns to step 156. After all of the samples are analyzed, the process proceeds to step 160, where the feature vectors are saved to memory as a set.

The actual computation of the training data begins in step 162, where the saved feature vector set is loaded from memory. After retrieving the feature vector set, the process progresses to step 164. At step 164, the program calculates statistics, such as the mean and standard deviation of the feature variables for each class. Intervariable statistics may also be calculated, including a covariance matrix of the sample set for each class. The process then advances to step 166 where it uses the set of feature vectors to compute the training data. At this step in the example embodiment, an inverse covariance matrix is calculated, as well as any fixed value terms needed for the classification process. After these calculations are performed, the process proceeds to step 168 where the training parameters are stored in memory and the training process ends.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method for identifying and correcting systematic noise in a pattern recognition classifier, comprising:
   rejecting a plurality of input patterns determined not to be associated with any of a set of at least one represented output class by the pattern recognition classifier;

selecting a subset of pattern samples from the rejected input patterns based upon the similarity of each pattern to one of the represented output classes;

subjecting the selected pattern samples to an independent review to determine if they were correctly rejected; and retraining the classifier based upon the independent review of the selected pattern samples.

2. A method as set forth in claim 1, wherein the step of subjecting the pattern samples to independent review includes subjecting the selected pattern samples to a computerized verification process.

3. A method as set forth in claim 1, wherein the step of subjecting the pattern samples to independent review includes outputting them to a human operator.

4. A method as set forth in claim 1, wherein the input patterns include scanned images.

5. A method as set forth in claim 4, wherein at least one of the represented output classes represents a variety of postal indicia.

6. A method as set forth in claim 4, wherein at least one of the represented output classes represents an alphanumeric character.

7. A computer program product, implemented on a computer readable medium and operative in a data processing system, for identifying and correcting systematic noise in a pattern recognition classifier, comprising:

a classification portion that rejects a plurality of input patterns determined not to be associated with any of a set of at least one represented output class;

a selection portion that selects a subset of pattern samples from the rejected input patterns based upon the similarity of each pattern to one of the represented output classes;

a review portion that subjects the selected pattern samples to an independent review to determine if they were correctly rejected; and a training portion that retrains the classifier based upon the independent review of the selected pattern samples.

8. A computer program product as set forth in claim 7, wherein the review portion submits the pattern samples to a computerized verification process.

9. A computer program product as set forth in claim 7, wherein the review portion outputs the selected pattern samples to a human operator.

10. A computer program product as set forth in claim 7, wherein the input patterns include scanned images.

11. A computer program product as set forth in claim 10, wherein at least one of the represented output classes represents a variety of postal indicia.

12. A computer program product as set forth in claim 10, wherein at least one of the represented output classes represents an alphanumeric character.

13. A method for identifying and correcting systematic noise in during run-time operation of a pattern recognition classifier, comprising:

classifying an input feature vector, having no known class affiliation, into one of a plurality of output classes to produce a selected output class and an associated confidence value;

rejecting a given input feature vector if its associated confidence value fails to meet a first threshold;

selecting a given feature vector if its associated confidence value meets a second threshold;

subjecting a plurality of selected pattern samples to an independent review to determine if they were correctly rejected; and retraining the classifier based upon the independent review of the selected pattern samples.

14. : A method as set forth in claim 13, wherein the step of subjecting the pattern samples to independent review includes subjecting the selected pattern samples to a computerized verification process.

15. A method as set forth in claim 13, wherein the step of subjecting the pattern samples to independent review includes outputting them to a human operator.

16. A method as set forth in claim 13, wherein the input patterns include scanned images.

17. A method as set forth in claim 16, wherein at least one of the represented output classes represents a variety of postal indicia.

18. A method as set forth in claim 16, wherein at least one of the represented output classes represents an alphanumeric character.

* * * * *